Feb. 22, 1955            H. C. ELLIS            2,702,611
FLUID PRESSURE CONTROLLED BRAKE FOR ELECTRIC MOTORS
Filed May 28, 1949            3 Sheets-Sheet 1
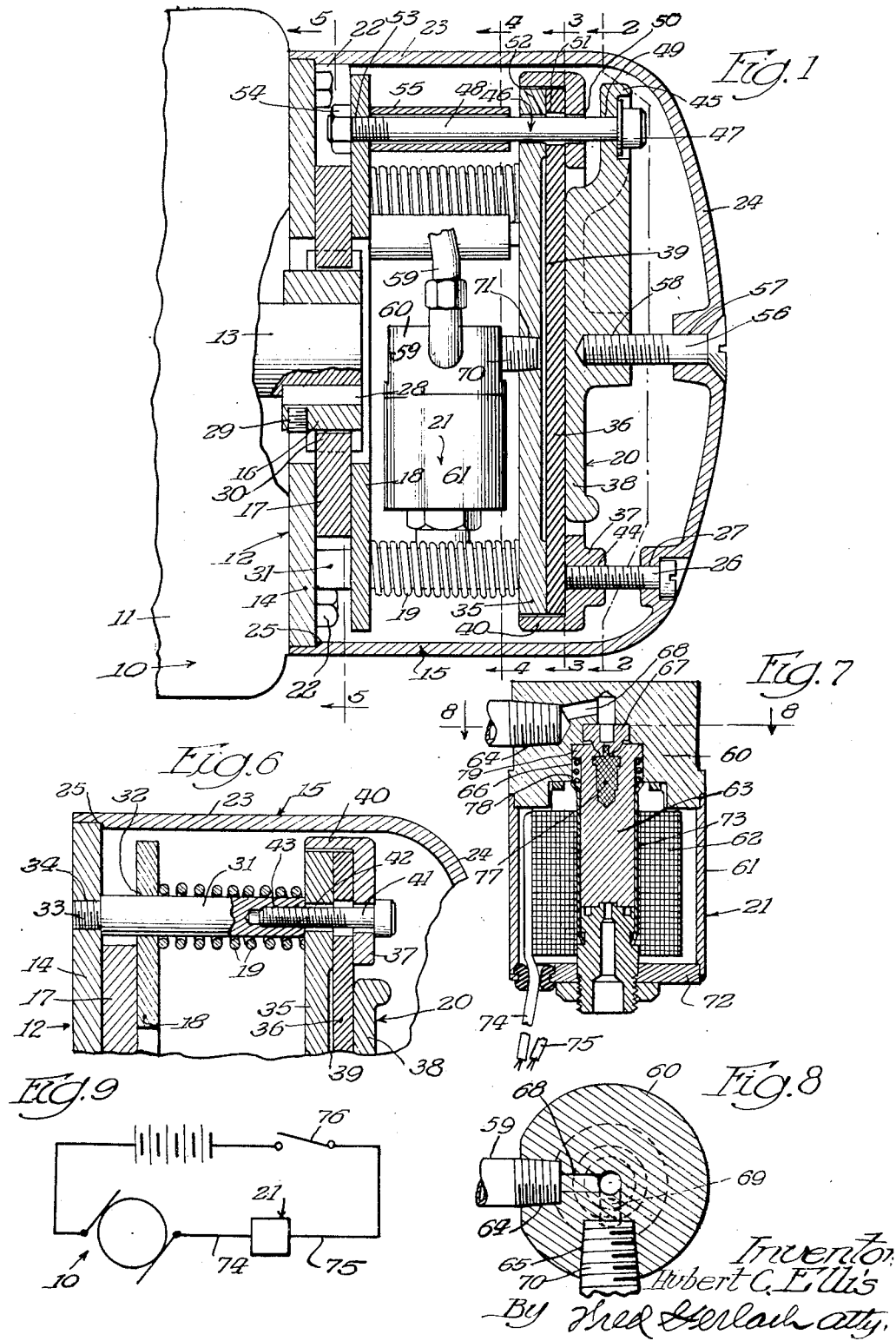
Inventor
Hubert C. Ellis
By Fred Gerlach atty.

Feb. 22, 1955 H. C. ELLIS 2,702,611
FLUID PRESSURE CONTROLLED BRAKE FOR ELECTRIC MOTORS
Filed May 28, 1949 3 Sheets-Sheet 3
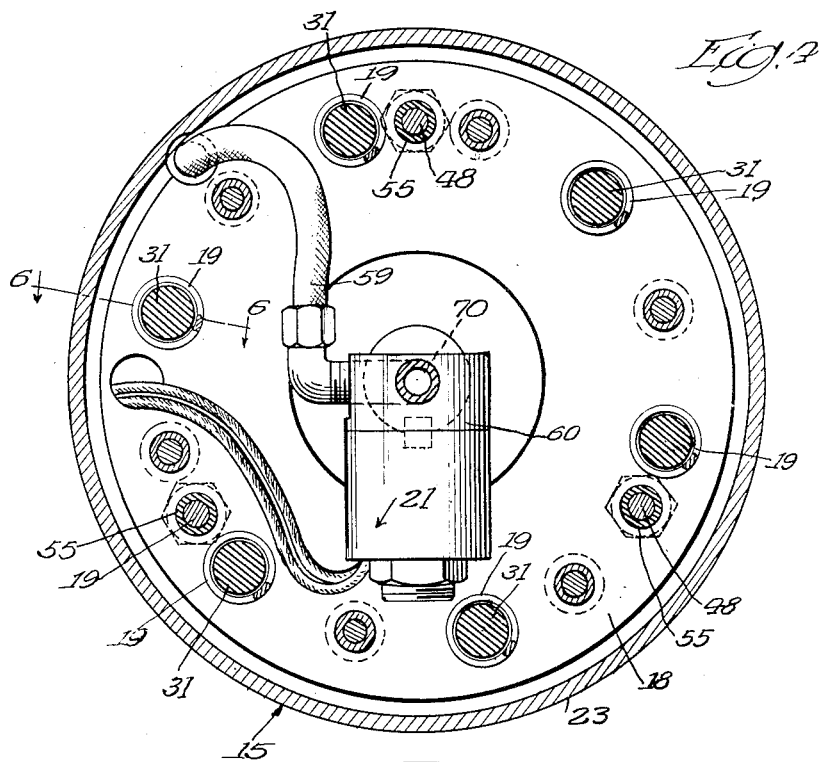
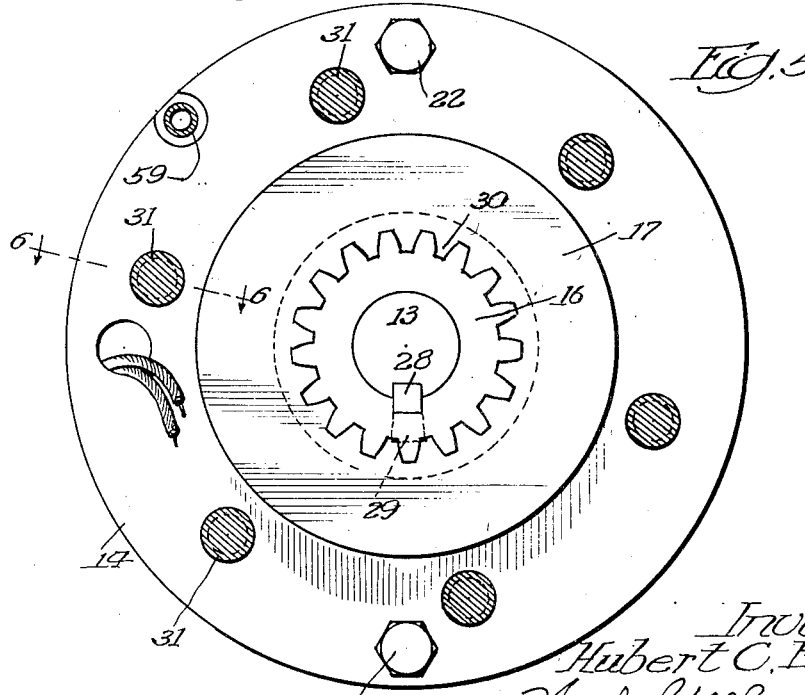

United States Patent Office 2,702,611
Patented Feb. 22, 1955

2,702,611

FLUID PRESSURE CONTROLLED BRAKE FOR ELECTRIC MOTORS

Hubert C. Ellis, Evanston, Ill.

Application May 28, 1949, Serial No. 96,072

5 Claims. (Cl. 188—170)

The present invention relates generally to fluid pressure controlled brakes. More particularly the invention relates to that type of brake which is designed primarily for use in connection with an electric motor for driving a machine, such, for example, as a washing machine or tumbler, and operates automatically when the electric circuit for the motor is broken to brake or arrest the motor rotor.

One object of the invention is to provide a fluid pressure controlled brake of this type which is an improvement upon, and has certain inherent advantages over, previously designed brakes for the same purpose and is characterized by the fact that it embodies a compact and novel arrangement of parts and operates in a highly efficient manner.

Another object of the invention is to provide an electric motor brake of the type under consideration which comprises as certain of the parts thereof a pair of juxtapositioned, coacting brake members, one of which is connected to rotate with the rotor of the motor and the other of which is movable laterally into and out of braking relation with the one member while at the same time it is held against rotation, and in addition comprises helical compression springs for urging the other member into braking relation with the one member and a diaphragm variety fluid pressure operated unit which operates when energized by the admission of fluid under pressure thereto to shift against the force of the springs the other brake member out of braking relation with the one member.

A further object of the invention is to provide a brake of the last mentioned type and character which comprises in addition to the parts heretofore mentioned a normally closed solenoid valve which is mounted on the diaphragm variety fluid pressure operated unit, is included in the circuit for the electric motor and operates when energized as the result of the motor circuit being closed to cause fluid under pressure to be supplied to the unit in order to actuate the latter for brake releasing purposes.

A still further object of the invention is to provide a fluid pressure controlled brake which is generally of new and improved construction and, due to the design and arrangement of parts thereof, may be produced and operated at a comparatively low cost.

Other objects of the invention and the various advantages and characteristics of the subject fluid pressure controlled brake will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 1 is a longitudinal section of a brake embodying the invention;

Figure 2 is a vertical transverse section taken on the line 2—2 of Figure 1 and illustrating in detail the construction and arrangement of the movable cap plate of the diaphragm fluid pressure controlled unit for shifting the spring biased brake member out of engagement or braking relation with the coacting brake member which is connected to rotate with the rotor of the motor to which the brake is applied;

Figure 4 is a vertical transverse section taken on the line 4—4 of Figure 1 and illustrating the arrangement and design of the helical compression springs for urging the movably mounted brake member into braking relation with the coacting brake member which rotates with the motor rotor;

Figure 5 is a vertical transverse section taken on the line 5—5 of Figure 1 and showing the design and manner of mounting of the brake member which is connected to rotate with the rotor of the motor;

Figure 6 is a longitudinal section taken on the line 6—6 of Figures 2, 4 and 5 and illustrating the manner of mounting of the helical compression springs which serve to urge the movable brake member into braking relation with the coacting brake member;

Figure 7 is a longitudinal section of the normally closed solenoid valve which is mounted on the fluid pressure controlled unit and serves when energized to cause fluid under pressure to enter the unit in order to actuate the latter;

Figure 8 is a transverse section of the valve taken on the line 8—8 of Figure 7; and Figure 9 is a diagram of the circuit for the solenoid valve and motor.

Figure 2:
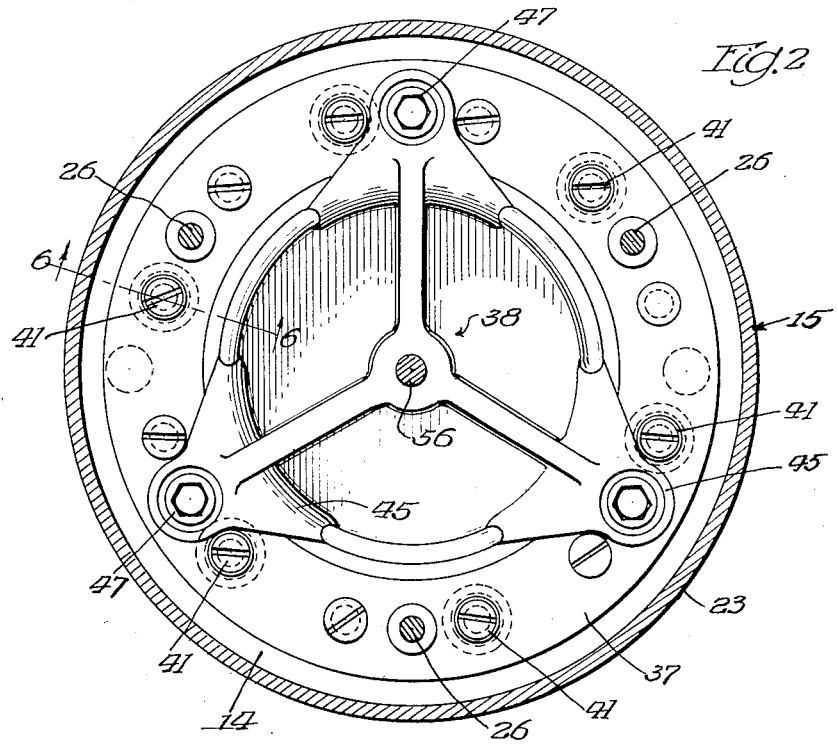
Figure 3:
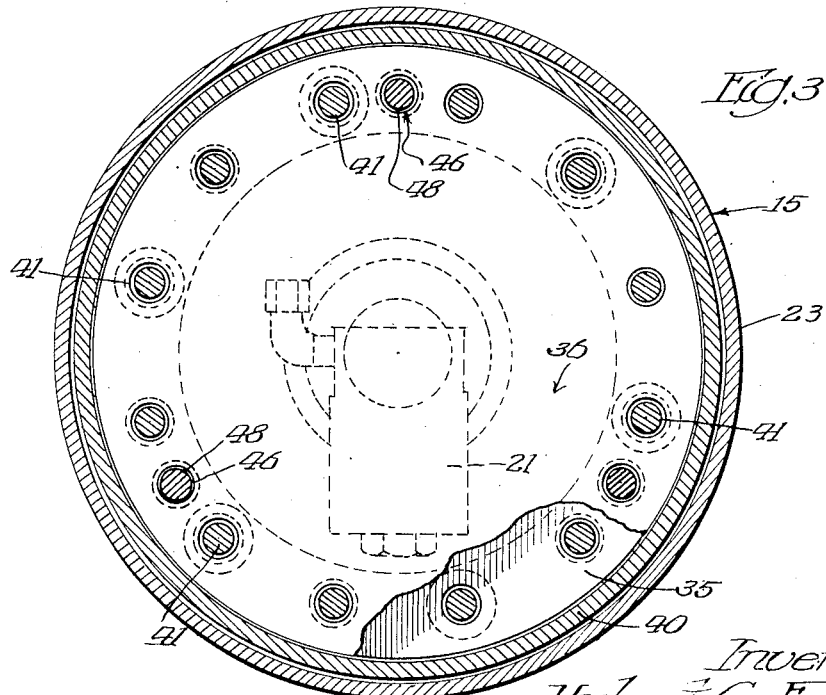
Figure 3 is a vertical transverse section taken on the line 3—3 of Figure 1 and showing in detail the design and manner of mounting of the diaphragm of the unit.

The brake which is shown in the drawings constitutes the preferred form or embodiment of the invention. It is illustrated in connection with an electric motor 10 and serves, as described hereafter in detail, automatically to stop or arrest the motor upon opening or breaking of the electric circuit therefor. The motor 10 is of conventional or standard construction and comprises a horizontally elongated substantially cylindrical casing 11 which embodies at one end thereof an end wall 12 and surrounds or encases a stator and a rotor (not shown). The rotor of the motor consists of an armature and this is mounted on a rotatable shaft 13, one end of which extends through an enlarged centrally disposed opening in the casing end wall 12. As its principal components or parts the brake comprises a mounting plate 14, a housing 15, a pinion 16, a pair of coacting brake members 17 and 18, compression springs 19, a fluid pressure controlled unit 20, and a normally closed solenoid valve 21.

The mounting plate 14 is ring shaped and surrounds, and is centrally positioned with respect to, the end of the shaft 13 that extends through the opening in the end wall 12 of the motor casing 11. It is flat sided and is fixed to the outer face of the end wall 12 by bolts 22. The shanks of these bolts extend through holes in the mounting plate 14 and into screw threaded holes in the casing end wall 12.

The housing 15 is cup shaped and serves to enclose the other parts of the brake. It is of one-piece character and consists of a cylindrical side wall 23 and an outwardly bulged end wall 24. The cylindrical side wall 23 of the housing is coaxially positioned with respect to the motor shaft 13 and has at the free or open margin thereof an internal annular groove 25 in which the outer margin of the ring shaped mounting plate 14 is seated when the housing 15 is in its operative or normal position. Cap screws 26 extend through holes 27 in the outer portion of the housing end wall 24 and serve removably to secure the housing in place. When these screws are removed the housing is free so that it may be shifted laterally away from the mounting plate 14 in order to expose the other parts of the brake. Preferably the housing 15 is in the form of a metallic casting.

The pinion 16 is mounted on the end of the motor shaft 13 that extends through the casing end wall 12 and the ring shaped mounting plate 14 and is fixedly secured in place by way of a key 28 which fits within opposed keyways in the motor shaft and the inner or hub portion of the pinion and is retained in place by way of a set screw 29.

The coacting brake members 17 and 18 are disposed adjacent the ring shaped mounting plate 14 and constitute the means or instrumentality for arresting rotation of the motor rotor relatively to the stator. They are formed of any suitable rigid material having a high coefficient of friction and, as shown in Figures 4 and 5, are ring shaped. The brake member 17 surrounds the pinion 16 and is flat sided. It is located directly outwards of the inner marginal portion of the ring shaped mounting plate 14 and has internal teeth 30. The latter are in mesh with the external teeth on the pinion 16 and cause the brake member 17 to rotate conjointly with the pinion while permitting such brake member to slide or move axially. The brake member 18 is located directly outwards of the brake member 17 and has a materially greater external diameter than said brake member 17. The inner marginal portion of the brake member 18 is in lapped relation with the outer end surface of the brake member 17. When the brake member 18 is shifted away from the mounting plate 14, as hereinafter described, the brake member 17 is free to rotate. When, however, the brake member 18 is shifted towards the mounting plate 14 the brake member 17 is arrested or stopped as the result of being clamped between the inner marginal portions of the brake member 18 and the mounting plate 14.

The compression springs 19 serve to urge the brake member 18 towards the mounting plate 14 into braking relation with the coacting brake member 17. They are helical and surround posts 31. As best shown in Figures 4 and 6 the springs 19 are disposed directly outwards of the outer marginal portion of the ring shaped brake member 18 and are arranged in an annular series within the interior of the cup shaped housing 15. The posts 31 are disposed directly inwards of, and in parallel relation with, the cylindrical side wall 23 of the housing and serve as guide type supports for the compression springs 19. The left hand ends of the posts, i. e., the ends that are nearer the mounting plate 14, extend loosely through circular holes 32 in the outer marginal portion of the brake member 18 and are provided at their extremities with reduced externally threaded stems 33. The latter fit within screw threaded holes 34 in the outer marginal portion of the mounting plate 14 and serve fixedly to connect the spring supporting posts to the mounting plate. The ends of the compression springs 19 that are adjacent the reduced stems 33 abut against the outer marginal portion of the ring shaped brake member 18 and the other ends of the springs abut against a fixed surface as hereinafter described. As stated before, the springs serve yielding to urge the brake member 18 into braking relation with the brake member 17.

The fluid pressure controlled unit 20 serves when energized to release the brake member 17 by shifting the brake member 18 away from it against the force or biasing action of the helical compression springs 19. It is located within the cup shaped housing 15 at a point directly inwards of the housing end wall 24 and consists of a diaphragm plate 35, a diaphragm 36, a diaphragm ring 37 and a diaphragm cap 38. The diaphragm plate 35 of the unit is circular and has its marginal portion in abutment with the right hand ends of the helical compression springs 19 and the spring supporting posts 31. It has in the side face thereof that is nearer the end wall 24 of the housing a cavity which forms or constitutes a circular pressure chamber 39. The diaphragm 36 of the fluid pressure controlled unit 20 is formed of any suitable flexible material. It is the same in diameter as the diaphragm plate 35. Its central portion defines the outer side of the pressure chamber 39 and its margin abuts against the marginal portion of the end face of the diaphragm plate that is nearer the housing end wall 24. When fluid under pressure is introduced or admitted into the pressure chamber 39 the central portion of the diaphragm 36 flexes away from the diaphragm plate 35. Upon release of fluid under pressure from the pressure chamber 39 the central portion of the diaphragm returns to its normal position. The diaphragm ring 37 serves to clamp the margin of the diaphragm 36 against the margin of the diaphragm plate 35. It abuts against the marginal portion of the exposed or outer side face of the diaphragm and embodies an integral inwardly extending annular flange 40 which surrounds the peripheries of the diaphragm and the diaphragm plate. As best shown in Figure 6, an annular series of cap screws 41 serves to clamp the margin of the diaphragm between the diaphragm ring 37 and the margin of the diaphragm plate 34 and also to hold the ring and diaphragm plate in fixed relation with the mounting plate 14 which, as heretofore pointed out, is fixedly connected to the end wall 12 of the motor casing 11. The shanks of the cap screws 14 extend through aligned holes 42 in the diaphragm ring 37 and the margins of the diaphragm 36 and the diaphragm plate 35 and fit within screw threaded sockets 43 in the ends of the spring supporting posts 31 that are remote from the mounting plate 14. As shown in Figure 1 the diaphragm ring 37 embodies integral internally threaded cylindrical bosses 44 which project in the direction of the housing end wall 24 and receive the shanks of the cap screws 26. The latter, as heretofore described, serve releasably to secure the housing 15 of the brake in its operative or normal position. The diaphragm cap 38 of the fluid pressure controlled unit 20 is in the form of a rigid metallic casting and fits against the central portion of the outer side face of the diaphragm. It is movable laterally in response to flexing of the diaphragm and embodies at its margin a plurality of outwardly extending, equidistantly spaced lugs 45 (see Figure 2). These lugs are spaced from the diaphragm ring 37 and together with bolts 46 serve so operatively to connect the diaphragm cap 38 to the ring shaped brake member 18 that when the cap plate is shifted away from the diaphragm plate 35 in response to flexing of the diaphragm 36 due to introduction of fluid under pressure into the pressure chamber 39 it operates to shift the brake member 18 away from the brake member 17 against the force or biasing action of the helical compression springs 19. The bolts 46 correspond in number to, and are associated respectively with, the lugs 45 and consist of heads 47 and screw threaded shanks 48. The heads of the bolts are disposed adjacent the outer faces of the lugs 45 and the shanks 48 extend through aligned holes 49, 50, 51, 52 and 53 which are formed respectively in the lugs 45, the diaphragm ring 37, the diaphragm 36, the diaphragm plate 35 and the outer margin of the brake member 18. The ends of the shanks 48 that extend through the holes 53 in the outer margin of the brake member 18 are provided with nuts 54 which abut against the inner side face of the brake member 18. The central portions of the shanks 48 of the bolts 46 are surrounded by stop sleeves 55. The latter are disposed beween the margin of the diaphragm plate 35 and the outer margin of the brake member 18 and serve to limit movement of the brake member 18 away from the coacting brake member 17 when the diaphragm cap 38 is shifted by the diaphragm 36 towards the housing end wall 24 in response to introduction of fluid under pressure into the pressure chamber 39. When the diaphragm cap is shifted towards the housing end wall due to outward flexing of the central portion of the diaphragm 36, the brake member 18 moves away from the coacting brake member 17 until its movement is arrested as a result of the ends of the stop sleeves 55 being brought into engagement with the margin of the diaphragm plate 35 and the outer margin of the brake member 18. A screw 56 extends slidably through a hole 57 in the central portion of the housing end wall 24 and has the shank thereof disposed within and connected to, a screw threaded boss 58 on the central portion of the diaphragm cap 38. This screw has a threefold purpose in that it serves to hold the diaphragm cap against edgewise movement with respect to the central portion of the diaphragm, to assist the cap screws 26 in releasably securing the housing 15 in its operative or normal position, and to limit inward movement of the diaphragm cap. The head of the screw 56 is located adjacent the outer face of the housing end wall 24.

The normally closed solenoid valve 21 is disposed within the cup shaped housing 15 between the brake member 18 and the diaphragm plate 35 and serves to control the supply of pressure under fluid to the pressure chamber 39 from any suitable source, including a supply pipe 59. Preferably the fluid is compressed air, and the source is either a compressed air storage tank or a motor driven air compressor, neither of which is shown. The solenoid valve 21 comprises a cylindrical body 60, a shell 61, a coil 62 and a core 63. The body 60 embodies a screw threaded inlet dust 64 and a screw threaded outlet duct 65. As best shown in Figure 7, these two ducts extend through the periphery or cylindrical side surface of the body 60 and are disposed diametrically opposite one another. The discharge end of the supply pipe 59 is externally threaded and fits within the inlet duct 64. Within the body 60 of the solenoid valve is a vertically extending cylindrical chamber 66. An orifice plug 67 is located at the upper end of the chamber 66 and communicates with the inlet duct 64 via an inverted L-shaped inlet port 68. An outlet port 69 leads from the chamber 66 to the outlet duct 65. The latter is connected to the central portion of the pressure chamber 39 by way of a screw threaded nipple 70, one end of which fits within the screw threaded outlet duct 65 and the other end of which fits within a screw threaded hole 71 in the central portion of a diaphragm plate 35 of the unit 20. As shown in Figure 1, the hole 71 extends completely through the diaphragm plate and leads to, and communicates with, the central portion of the pressure chamber 39. The shell 61 of the solenoid valve 21 is connected to, and depends from, the lower end of the body 60 and embodies at its lower end a circular, centrally apertured head 72. The coil 62 is disposed within the shell 61 and surrounds a vertically extending sleeve 73, the upper end of which is disposed adjacent the lower end of the chamber 66. Conductors 74 and 75 are associated with the coil and, as shown in Figure 9, are connected to, and included in, the circuit for the electric motor 10. Such circuit includes a source of electrical energy and a switch 76. When the switch is closed the circuit for the motor 10 and the coil 62 of the solenoid valve 21 is completed with the result that the motor and the coil are energized. The core 63 of the solenoid valve 21 is slidably mounted for vertical sliding movement within the sleeve 73 and has at its upper end packing 77 which, when the core is slid upwards, seats against and serves to close the orifice in the plug 67 to the end that supply of compressed air to the chamber 66 is cut off. A helical compression spring 78 serves to urge the core 63 upwards. This spring surrounds the upper end of the core and has its lower end in abutment with the upper end of the sleeve 73 and its upper end in abutment with an annular outwardly extending flange 79 on the upper end of the core. When the coil 62 of the solenoid valve 21 is supplied with current the core 63 is caused to slide downwards against the force of the compression spring 78 and hence exposes the orifice in the plug 67. As soon as the orifice in the plug is opened or uncovered compressed air flows through the inlet duct 64, the port 68, and into the chamber 66 via the orifice in the plug. From the chamber 66 the compressed air flows through the outlet port 69, the outlet duct 65 and the nipple 70 into the pressure chamber 39 where, as previously pointed out, it causes outward flexure of the diaphragm 36. Such flexure on the part of the diaphragm results in the brake member 18 being shifted away from the mounting plate 14 out of braking relation with the brake member 17. When the supply of current to the coil 62 is interrupted by opening of the switch 76 the compression spring 79 slides the core 63 upwards into its closed position wherein it cuts off the flow of compressed air to the chamber 66. When the core is in its closed position the chamber 66 is vented in any suitable manner in order that there is no residual pressure within the chamber 39 and the helical compression springs 19 serve to shift the brake member 18 into braking relation with the brake member 17.

When the switch 76 is closed the coil 62 of the solenoid valve 21 is energized as heretofore mentioned and results in the core 63 sliding downwards into its open position against the force of the helical compression spring 78. As soon as the core is slid downwards compressed air flows into the pressure chamber 39 and causes the diaphragm 36 to flex outwards in the direction of the end wall 24 of the cup shaped housing 15. Outward flexure of the diaphragm results in the diaphragm cap 38 and the bolts 46 shifting the brake member 18 away from the brake member 17. This results in release of the brake and operation of the electric motor 10. When the switch 76 is opened the coil 62 of the solenoid valve is immediately de-energized with the result that the core 63 is slid upwards into its closed position by the action of the compression spring 66. Upon upward shifting of the core the springs 19 shift the brake member 18 into braking relation with the brake member 17, thus causing arrest or stoppage of the motor shaft 13.

The herein described fluid pressure controlled brake effectively and efficiently fulfills its intended purpose and involves a simple and novel arrangement of parts. It serves immediately upon interruption of current to the electric motor to stop or brake the motor shaft 13 and is automatically released upon supply of current to the motor. Because of the arrangement of the various component parts the brake occupies but a comparatively small space and is capable of being produced at a low and reasonable cost.

The invention is not to be understood as restricted to the details set forth since these may be modified within the scope of the appended claims without departing from the spirit and scope of the invention.

Having thus described the invention what I claim as new and desire to secure by Letters Patent is:

1. A fluid pressure controlled brake adapted for use with an electric motor of the type that has a casing and an armature shaft with one end thereof extending through one end wall of the casing, and comprising a mounting plate mounted fixedly on the outer surface of the one end wall of the motor casing and provided with a central opening through which the one end of the armature shaft extends; a plate type brake member disposed directly outwards of the mounting plate and mounted on said one end of the armature shaft so that it is rotatable therewith while at the same time it is movable laterally into and out of gripping relation with the mounting plate; a non-rotatable coacting plate type brake member positioned directly outwards of the first mentioned brake member, movable laterally towards the mounting plate so as to clamp the first mentioned brake member between it and the mounting plate and away from said mounting plate so as to release said first mentioned brake member, and provided with an annular series of holes in its outer marginal portion; a fluid pressure operated unit spaced outwards of the second mentioned brake member and embodying a rigid diaphragm plate with a pressure chamber in the central portion of its outer side surface and an annular series of holes in its outer marginal portion, and a flexible diaphragm fitting against the outer side surface of the diaphragm plate, extending across the pressure chamber, and adapted when fluid under pressure is introduced into the chamber to flex outwards away from the second mentioned brake member; an annular series of post-elements extending between the mounting plate and the unit, having certain ends thereof extending loosely through said holes in the outer marginal portion of the second mentioned brake member and connected fixedly to the outer marginal portion of the mounting plate and their other ends abutting against, and connected fixedly to, the outer marginal portion of the diaphragm plate, and serving to hold the unit in fixed relation with the mounting plate and also to retain the second mentioned brake member against rotation; means operative so to connect the diaphragm to the second mentioned brake member that the diaphragm in response to outward flexure thereof moves said second mentioned brake member away from the mounting plate and consisting of a diaphragm cap disposed outwards of, and fitting against, the central portion of the diaphragm and provided with outwardly extending lugs, and an annular series of rod-elements disposed between, and independent of, the post-elements, extending loosely through said holes in the outer marginal portion of the diaphragm plate, and having certain ends thereof connected to the lugs and their other ends connected to the outer marginal portion of the second mentioned brake member; a connection operative to supply fluid under pressure into the pressure chamber and including a control valve; and compression springs extending around certain of the elements and between the second mentioned brake member and the diaphragm plate and operative to urge said second mentioned brake member towards the mounting plate upon release of fluid under pressure in the pressure chamber.

2. A fluid pressure controlled brake adapted for use with an electric motor of the type that has a casing and an armature shaft with one end thereof extending through one end wall of the casing, and comprising a mounting plate mounted fixedly on the outer surface of the one end wall of the motor casing and provided with a central opening through which the one end of the armature shaft extends; a plate type brake member disposed directly outwards of the mounting plate and mounted on said one end of the armature shaft so that it is rotatable therewith while at the same time it is movable laterally into and out of gripping relation with the mounting plate; a non-rotatable coacting plate type brake member positioned directly outwards of the first mentioned brake member, movable laterally towards the mounting plate so as to clamp the first mentioned brake member between it and the mounting plate and away from said mounting plate so as to release said first mentioned brake member, and provided with an annular series of holes in its outer marginal portion; a fluid pressure operated unit spaced outwards of the second mentioned brake member and embodying a rigid diaphragm plate with a pressure chamber in the central portion of its outer side surface and an annular series of holes in its outer marginal portion, and a flexible diaphragm fitting against the outer side surface of the diaphragm plate, extending across the pressure chamber, and adapted when fluid under pressure is introduced into the chamber to flex outwards away from the second mentioned brake member; an annular series of posts extending between the mounting plate and the unit, having certain ends thereof extending loosely through said holes in the outer marginal portion of the second mentioned brake member and connected fixedly to the outer marginal portion of the mounting plate and their other ends abutting against, and connected fixedly to, the outer marginal portion of the diaphragm plate, and serving to hold the unit in fixed relation with the mounting plate and also to retain the second mentioned brake member against rotation; means operative so to connect the diaphragm to the second mentioned brake member that the diaphragm in response to outward flexure thereof moves said second mentioned brake member away from the mounting plate and consisting of a diaphragm cap disposed outwards of, and fitting against, the central portion of the diaphragm and provided with outwardly extending lugs, and an annular series of rods disposed between, and independent of, the posts; extending loosely through said holes in the outer marginal portion of the diaphragm plate and having certain ends thereof connected to the lugs and their other ends connected to the outer marginal portion of the second mentioned brake member; a connection operative to supply fluid under pressure into the pressure chamber and including a control valve; means for limiting outward flexing of the diaphragm embodying stop sleeves extending around the rods and between the second mentioned brake member and the diaphragm plate; and compression springs extending around the posts and between the second mentioned brake member and the diaphragm plate and operative to urge said second mentioned brake member towards the mounting plate upon release of fluid under pressure in the pressure chamber.

3. A fluid pressure controlled brake adapted for use with an electric motor of the type that has a casing and an armature shaft with one end thereof extending through one end wall of the casing, and comprising a mounting plate mounted fixedly on the outer surface of the one end wall of the motor casing and provided with a central opening through which the one end of the armature shaft extends; a plate type brake member disposed directly outwards of the mounting plate and mounted on said one end of the armature shaft so that it is rotatable therewith while at the same time it is movable laterally into and out of gripping relation with the mounting plate; a non-rotatable coacting plate type brake member positioned directly outwards of the first mentioned brake member, movable laterally towards the mounting plate so as to clamp the first mentioned brake member between it and the mounting plate and away from said mounting plate so as to release said first mentioned brake member, and provided with an annular series of holes in its outer marginal portion; a fluid pressure operated unit spaced outwards of the second mentioned brake member and embodying a rigid diaphragm plate with a pressure chamber in the central portion of its outer side surface, and a flexible diaphragm fitting against the outer side surface of the diaphragm plate, extending across the pressure chamber, and adapted when fluid under pressure is introduced into the chamber to flex outwards away from the second mentioned brake member; an annular series of posts extending between the mounting plate and the unit, having certain ends thereof extending loosely through said holes in the outer marginal portion of the second mentioned brake member and connected fixedly to the outer marginal portion of the mounting plate and their other ends abutting against, and connected fixedly to, the outer marginal portion of the diaphragm plate, and serving to hold the unit in fixed relation with the mounting plate and also to retain the second mentioned brake member against rotation; means operative so to connect the diaphragm to the second mentioned brake member that the diaphragm in response to outward flexure thereof moves said second mentioned brake member away from the mounting plate and consisting of a diaphragm cap disposed outwards of, and fitting against, the central portion of the diaphragm and provided with outwardly extending lugs, and an annular series of rods disposed between, and independent of, the posts and having certain ends thereof connected to the lugs and their other ends connected to the outer marginal portion of the second mentioned brake member; a connection operative to supply fluid under pressure into the pressure chamber and including a normally closed solenoid valve disposed between the second mentioned brake member and the diaphragm plate and located within the posts and rods; and compression springs extending around the posts and between the second mentioned brake member and the diaphragm plate and operative to urge said second mentioned brake member towards the mounting plate upon release of fluid under pressure in the pressure chamber.

4. A fluid pressure controlled brake adapted for use with an electric motor of the type that has a casing and an armature shaft with one end thereof extending through one end wall of the casing, and comprising a mounting plate mounted fixedly on the outer surface of the one end wall of the motor casing and provided with a central opening through which the one end of the armature shaft extends; a plate type brake member disposed directly outwards of the mounting plate and mounted on said one end of the armature shaft so that it is rotatable therewith while at the same time it is movable laterally into and out of gripping relation with the mounting plate; a non-rotatable coacting plate type brake member positioned directly outwards of the first mentioned brake member, movable laterally towards the mounting plate so as to clamp the first mentioned brake member between it and the mounting plate and away from said mounting plate so as to release said first mentioned brake member, and provided with an annular series of holes in its outer marginal portion; a fluid pressure operated unit spaced outwards of the second mentioned brake member and embodying a rigid diaphragm plate with a pressure chamber in the central portion of its outer side surface, and a flexible diaphragm fitting against the outer side surface of the diaphragm plate, extending across the pressure chamber, and adapted when fluid under pressure is introduced into the chamber to flex outwards away from the second mentioned brake member; an annular series of posts extending between the mounting plate and the unit, having certain ends thereof extending loosely through said holes in the outer marginal portion of the second mentioned brake member and connected fixedly to the outer marginal portion of the mounting plate and their other ends abutting against, and connected fixedly to, the outer marginal portion of the diaphragm plate, and serving to hold the unit in fixed relation with the mounting plate and also to retain the second mentioned brake member against rotation; means operative so to connect the diaphragm to the second mentioned brake member that the diaphragm in response to outward flexure thereof moves said second mentioned brake member away from the mounting plate and consisting of a diaphragm cap disposed outwards of, and fitting against, the central portion of the diaphragm and provided with outwardly extending lugs, and an annular series of rods disposed between, and independent of the posts and having certain ends thereof connected to the lugs and their other ends connected to the outer marginal portion of the second mentioned brake member; a connection operative to supply fluid under pressure into the pressure chamber and including a control valve; compression springs extending around the posts and between the second mentioned brake member and the diaphragm plate and operative to urge said second mentioned brake member towards the mounting plate upon release of fluid under pressure in the pressure chamber; a stationary cup-shaped housing comprising an end wall outwards of the diaphragm cap and a continuous inwardly projecting side wall extending around the unit and the first and second mentioned brake members and having its inner marginal portion connected to the mounting plate; and a screw having one end thereof extending slidably through the central portion of the housing end wall, and its other end connected to the diaphragm cap, and provided on the extremity of its one end with a head that is disposed outwards of said housing end wall and coacts therewith to limit inward movement of the diaphragm cap.

5. A fluid pressure controlled brake adapted for use with an electric motor of the type that has a casing and an armature shaft with one end thereof extending through one end wall of the casing, and comprising a mounting plate mounted fixedly on the outer surface of the one end wall of the motor casing and provided with a central opening through which the one end of the armature shaft extends; a plate type brake member disposed directly outwards of the mounting plate and mounted on said one end of the armature shaft so that it is rotatable therewith while at the same time it is movable laterally into and out of gripping relation with the mounting plate; a non-rotatable coacting plate type brake member positioned directly outwards of the first mentioned brake member, movable laterally towards the mounting plate so as to clamp the first mentioned brake member between it and the mounting plate and way from said mounting plate so as to release said first mentioned brake member, and provided with an annular series of holes in its outer marginal portion; a fluid pressure operated unit spaced outwards of the second mentioned brake member and embodying a rigid diaphragm plate with a pressure chamber in the central portion of its outer side surface and an annular series of holes in its outer marginal portion, and a flexible diaphragm fitting against the outer side surface of the diaphragm plate, extending across the pressure chamber, and adapted when fluid under pressure is introduced into the chamber to flex outwards away from the second mentioned brake member; an annular series of posts extending between the mounting plate and the unit, having certain ends thereof extending loosely through said holes in the outer marginal portion of the second mentioned brake member and connected fixedly to the outer marginal portion of the mounting plate and their other ends abutting against, and connected fixedly to, the outer marginal portion of the diaphragm plate, and serving to hold the unit in fixed relation with the mounting plate and also to retain the second mentioned brake member against rotation; means operative so to connect the diaphragm to the second mentioned brake member that the diaphragm in response to outward flexure thereof moves said second mentioned brake member away from the mounting plate and consisting of a diaphragm cap disposed outwards of, and fitting against, the central portion of the diaphragm and provided with outwardly extending lugs, and an annular series of rods disposed between, and independent of, the posts, extending loosely through said holes in the outer marginal portion of the diaphragm plate and having certain ends connected to the lugs and their outer ends connected to the outer marginal portion of the second mentioned brake member; a connection operative to supply fluid under pressure into the pressure chamber and including a normally closed solenoid valve disposed between the second mentioned brake member and the diaphragm plate and located within the posts and rods; means for limiting outward flexing of the diaphragm embodying stop sleeves mounted on the rods and disposed between the second mentioned brake member and the diaphragm plate; compression springs extending around the posts and between the second mentioned brake member and the diaphragm plate and operative to urge said second mentioned brake member towards the mounting plate upon release of fluid under pressure in the pressure chamber; a cup-shaped housing comprising an end wall outwards of the diaphragm cap and a continuous inwardly extending side wall extending around the unit and the first and second mentioned brake members and having its inner marginal portion connected to the mounting plate; and a screw having one end thereof extending slidably through the central portion of the housing end wall and its other end connected to the diaphragm cap, and provided on the extremity of its said one end with a head that is disposed outwards of said housing end wall and coacts therewith to limit inward movement of the diaphragm cap.

References Cited in the file of this patent

UNITED STATES PATENTS

| | | |
|---|---|---|
| 712,833 | Moore | Nov. 4, 1902 |
| 1,264,299 | Hellmund | Apr. 30, 1918 |
| 1,561,722 | Jimerson | Nov. 17, 1925 |
| 2,089,733 | Criley | Aug. 10, 1937 |
| 2,382,263 | Schnell | Aug. 14, 1945 |
| 2,525,461 | Schnell | Oct. 10, 1950 |